Patented May 30, 1944

2,350,295

UNITED STATES PATENT OFFICE 2,350,295

ACTIVE GLUCOSIDES OF SENNA AND A PROCESS FOR THEIR PREPARATION

Arthur Stoll, Walter Kussmaul, and Balthasar Becker, Basel, Switzerland, assignors to Sandoz Ltd., Fribourg, Switzerland, a corporation of Switzerland No Drawing. Application July 17, 1941, Serial No. 402,870. In Switzerland May 13, 1941

6 Claims. (Cl. 260—210)

The present invention relates to new active glucosides of senna and to a process for their preparation from senna-leaves and -pods.

For many centuries senna-leaves and -pods (the leaves and fruit of Cassia, especially those of *Cassia angustifolia* and *Cassia acutifolia*) have been used medically on account of their mild laxative properties. The use of the crude drug is not convenient owing to the disagreeable effects caused by the secondary substances contained therein. Further, the inconstancy of the active principles in the crude drug renders an accurate dosage difficult.

Several attempts have been made to obtain from the drug a pure extract of the active principles (see for example German Patents 646,651, 648,378 and 656,990), one of such attempts (W. Straub and H. Gebhardt, Archiv exp. Path. Pharm. 175, 403 (1936)) resulting in the isolation of a crystallized glucoside whose aglucone the authors formulated as anthranol of aloe emodin.

It has now been found that the greater part of the therapeutically valuable substances of senna-leaves has such acid properties that it is possible to precipitate them, from appropriate solvents, in the form of their earth-alkaline salts in such a high-percentage of purity that the glucosides, liberated from the alkaline-earth precipitate by acidification, can be separated and obtained in fine, pure crystalline form. As a result, it was found that two distinctly different glucosides are present in senna, which are now obtainable in their pure genuine form and possess the laxative properties of senna-leaves and -pods. These two glucosides have been called Sennoside A and Sennoside B.

For carrying out the above process, extracts obtained in any way may be of use, for instance, those obtained according to the German Patents 646,651 or 656,990, which of course must still contain the active principles in their original composition. To precipitate the glucosides as alkaline-earth salts, the extracts can be, for instance, dissolved in methyl alcohol, if they are not already methyl alcoholic extracts, and treated with a methylalcoholic solution of alkaline-earth salts. According to the purity of the initial extract a more or less large amount of impurities, which can be separated, precipitates out. From the clarified solution the glucosides are precipitated by means of a basic substance as loam-yellow alkaline-earth salts. The addition of bases is continued, while the solution being vigorously stirred, until the red-brown coloration, which occurs at the place where the bases are added, begins to disappear only slowly. If further addition of bases is made until the red-brown coloration remains, impurities precipitate, from which, for instance, kampferin can be isolated. The precipitate is then separated from the mother liquor and treated as follows. It can be suspended, for example, in methyl alcohol and the glucosides freed by acidification; thus the easily soluble Sennoside B goes first into solution and can be easily separated from Sennoside A which is only soluble in far greater quantities of methanol. On concentration of the solution, Sennoside B crystallizes out in a practically pure form. The remaining insoluble part is then suspended in a large amount of solvent, preferably with the addition of a basic substance, in order to get Sennoside A in solution and to separate it from insoluble alkaline earth salts. By means of appropriate concentration of the solution, if necessary by acidification, this glucoside can also be obtained in a practically pure crystallized form.

The foregoing results can also be obtained by the use of a high percentage aqueous methyl alcohol or with mixtures of different alcohols instead of pure methyl alcohol. The chlorides and bromides of the alkaline-earth metals should be preferably used. It is advantageous to use as basic substances either ammonia, methylamine, ethylamine, pyridine, etc. The precipitation of the alkaline earth salts of the glucosides can also be easily obtained by the direct use of basic alkaline earth derivatives (e. g. barium methylate), but attention must be paid to the sensitivity of the glucosides to strong alkali influences.

The precipitation of the glucosides as alkaline earth salts can also be obtained by dissolving the extracts of senna-leaves in methyl alcohol, adding thereto first bases until a slight alkaline reaction occurs, and precipitating the glucosides by addition of a methyl alcoholic solution of an alkaline earth salt. The precipitates thus obtained can then be treated as described above.

To transform the glucosides into free acids and for later separation based on their different solubilities, acids (sulphuric acid, oxalic acid, gluconic acid, etc., etc.), which give with alkaline earth ions difficultly soluble salts, can be used with advantage. The glucosides can also be separated by the use of other organic solvents instead of pure methyl alcohol, for instance, by the use of a mixture with ethyl alcohol in which the glucosides are less soluble. The high percentage glucosides thus obtained can be crystallized by thorough purification with methyl alcohol, glycol monomethylether, glycol monoethylether, etc., or with a mixture of these solvents with water.

The glucosides obtained according to the foregoing processes are fine yellow crystallized compounds. Acid dissociation and oxidation transform the aglucone part into rheïn (1:8-dihydroxyanthraquinone-3-carboxylic acid).

Sennoside A and Sennoside B differ from each other in color, solubility and in stability to dissociation. Sennoside A is darker yellow and is much less soluble in alcohol and water and splits less easily than Sennoside B.

Both glucosides give more or less water-soluble salts, a number of which like the salts of sodium, potassium, calcium, barium, strontium, ammonium, trimethylamine, triethanolamine etc. have been prepared. As an illustrative example of such salts we give the calcium salts of the new glucosides.

The calcium salt of Sennoside A crystallizes from aqueous acetone with some per cent of crystal acetone; this compound contains 4.08% of calcium. The calcium salt of Sennoside B, when precipitated from an aqueous solution with acetone, contains 4.47% of calcium.

The new glucosides are different in their composition from the glucoside described by Straub and Gebhardt, as the following table shows:

|  | Straub's glucoside | New glucosides |
| --- | --- | --- |
| C-content | 53.05% | 58%. |
| H-content | 4.27% | 4.5%. |
| Aglucone | Aloe emodin derivative (1:8-dihydroxy-3-hydroxymethylanthraquinone). | Rheïn derivative (1:8-dihydroxyanthraquinone-3-carboxylic acid). |
| Aglucone content | 42% | 62%. |

The glucosides obtained by the foregoing methods have, up to now, neither been isolated in a pure form nor been described in any publication.

One object of the present invention consists of the new active crystallized glucosides of senna, which are yellow crystallized compounds giving an acid dissociation and oxidation rheïn as aglucone part, which give water soluble salts and which possess the laxative properties of the senna.

Another object of the present invention consists of the water-soluble salts of the new glucosides of senna, which are yellow compounds, soluble in water and possessing the laxative properties of the senna.

Another object of the present invention is the process for the preparation of the new active crystallized glucosides of senna, which comprises the steps of taking an extract of senna, dissolving it in an alcohol and treating the solution with an alkaline earth salt and bases in order to precipitate the glucosides in form of their alkaline earth salts, and liberating the free glucosides from the alkaline earth salts by an acid treatment and separating the glucosides by fractional crystallization or fractional extraction.

Still another object of the present invention is the use of methanol as solvent for the glucosides in the process for their preparation in pure form.

The following examples illustrate the present invention:

*Example 1*

1 kg. of finely ground senna-leaves are freed from dyes (such as chlorophyll and free hydroxyanthraquinone), resins and other secondary substances by repeated extractions with benzene, which should preferably contain 1-5% of alcohol. After removal of the benzene, the drug is exhaustively extracted with methanol; the extract is then reduced to 2-4 liters in a vacuum below 40° C. and 150 ccm. of a 10% solution in methanol of anhydrous calcium chloride are then added to the yellowish, red-brown solution which reddens litmus paper. According to the quality of the drug only a small amount of impurities is thereby precipitated and separated. Methylalcoholic ammonia is then added slowly to the filtrate, until the red-brown coloration only disappears slowly. The copious loam-yellow precipitate of alkaline earth salts of the glucosides is filtered, washed with methanol and dried in a vacuum. It weighs, according to the quality of the drug, 10-40 g. It is not hygroscopic, is easily soluble in water, giving yellow to light brown neutral solutions. The product thus obtained is suspended in about 10 times its amount of methanol and mixed with gluconic acid until a weak congo acid reaction takes place. It is then heated to 40° C. and filtered, the insoluble part, containing Sennoside A, remaining on the filter. The dark brown filtrate after addition of some water is evaporated to syrup consistency. Sennoside B crystallizes from the thick aqueous gluconic acid solution. After being left at room temperature for 12 hours, the yellowish crystals are filtered and thoroughly washed, first with water and then with alcohol. Yield: 2-4 g.

By recrystallization from glycol monoethylether-water (1:2) light yellow, prismatic needles of pure glucoside B are obtained.

The remaining residue, which is insoluble in methanol, is suspended in methanol and mixed with ammonia, until stable alkaline reaction. It is then filtered from insoluble calcium gluconate and some impurities and the filtrate poured into alcoholic hydrobromic acid, from which Sennoside A crystallizes out. The crystals after being washed with methanol weigh dry 4-6 g. Recrystallization from boiling glycol monoethylether-water (1:1) gives bright yellow, rectangular plates. Instead of gluconic acid, an aqueous or methanolic oxalic acid solution can be used with the same success. The yield in glucosides can vary within wide limits according to the origin and quality of the drug.

*Example 2*

1 kg. of finely ground senna leaves or senna pods is stirred for half an hour in 5 liters of 33% aqueous acetone containing 20 g. of sodium carbonate and sucked through a filter. The drug is extracted with again the same amount of fresh 33% aqueous acetone and 20 g. of soda. The extracts are then neutralized with acetic acid until litmus paper is only slightly colored blue. After evaporation in vacuo below 40° C., 370 g. of dry residue are generally obtained. This residue is then taken up with methanol and treated with hydrobromic acid until the solution colors congo paper light violet. The glucosides, freed from their salts, go into solution and 50-70 g. of secondary substances remain insoluble. From the clear solution the glucosides are precipitated as in Example 1 by addition of 100 g. of barium bromide and the respective quantity of ammonia. The 30-60 g. of barium salts of the glucosides thus obtained are dissolved in six times their amount of water at a temperature of about 40° C. and then stirred into 200 ccm. of methanol. The suspension thus formed is acidified with oxalic acid and treated as in Example 1. Both glucosides will then be obtained in the same purity and quantity as in the previous example.

What we claim is:

1. A process for the manufacture of new active, crystallized glucosides of senna, comprising the steps of treating an extract of senna-leaves and -pods dissolved in methanol, with a methanol-soluble alkaline earth-metal salt and with a base selected from the group consisting of ammonia and amines, and separating the precipitated alkaline earth salts of the glucosides.

2. A process for the manufacture of new active, crystallized glucosides of senna, comprising the steps of treating an extract of senna-leaves and -pods dissolved in methanol, with a methanol-soluble alkaline earth-metal salt and with a base selected from the group consisting of ammonia and amines, separating the precipitated alkaline-earth salts of the glucosides, subjecting them to a treatment with acids in presence of a diluent in order to liberate the free glucosides, and separating the glucosides by fractional extraction with methanol.

3. A process for the manufacture of new active, crystallized glucosides of senna, comprising the steps of treating an extract of senna-leaves and -pods dissolved in methanol, with a methanol solution of calcium chloride and ammonia, separating the precipitated calcium salts of the glucosides, subjecting them in presence of a diluent to a treatment with acids giving difficultly soluble calcium salts, and separating the glucosides by fractional extraction with methanol.

4. A process for the manufacture of new active, crystallized glucosides of senna, comprising the steps of treating an extract of senna-leaves and -pods dissolved in methanol, with a methanol solution of calcium chloride and ammonia, separating the precipitated calcium salts of the glucosides, treating them in presence of a diluent with oxalic acid, and separating the glucosides by fractional extraction with methanol.

5. The new water-soluble alkaline-earth metal salts of the glucosides of senna, which glucosides contain about 58% of carbon, 4.5% of hydrogen and about 62% of aglucone and which give on acid cleavage and oxidation, as derivative of the aglucone, the 1.8-dihydroxyanthraquinone-3-carboxylic acid, which salts are soluble in water with a yellow coloration and possess strong laxative properties.

6. The new water-soluble calcium salts of the glucosides of senna, which glucosides contain about 58% of carbon, 4.5% of hydrogen and about 62% of aglucone and which give on acid cleavage and oxidation, as derivative of the aglucone, the 1.8-dihydroxyanthraquinone - 3 - carboxylic acid, which salts are soluble in water with a yellow coloration and possess strong laxative properties.

ARTHUR STOLL.
WALTER KUSSMAUL.
BALTHASAR BECKER.